United States Patent

Ishimaru

[11] Patent Number: 5,865,289
[45] Date of Patent: Feb. 2, 1999

[54] HYDRAULIC ENGAGEMENT APPARATUS FOR AUTOMATIC TRANSMISSIONS

[75] Inventor: Wataru Ishimaru, Ebina, Japan

[73] Assignee: JATCO Corporation, Fuji, Japan

[21] Appl. No.: 781,839

[22] Filed: Jan. 10, 1997

[30] Foreign Application Priority Data

Jan. 12, 1996 [JP] Japan ................................... 8-003725

[51] Int. Cl.⁶ ....................... F16D 19/00; F16D 25/0638; F16D 25/10
[52] U.S. Cl. .................. 192/87.11; 192/87.1; 192/106 F; 475/116; 475/269
[58] Field of Search ............................. 192/87.11, 87.15, 192/87.16, 106 F; 475/269, 116

[56] References Cited

U.S. PATENT DOCUMENTS

| Re. 27,937 | 3/1974 | Hensel | 192/87.11 |
| 3,747,730 | 7/1973 | Hause | 192/87.11 |
| 4,716,787 | 1/1988 | Miura et al. | 192/87.11 X |
| 4,957,195 | 9/1990 | Kano | 192/87.1 X |
| 5,069,657 | 12/1991 | Taniguchi | 192/87.11 X |
| 5,662,198 | 9/1997 | Kojima et al. | 192/87.11 |

FOREIGN PATENT DOCUMENTS 0 692 649 A1  1/1996  European Pat. Off. .

OTHER PUBLICATIONS

K. Fujita et al., "Advanced Shift Control Technology on Newyl–developed Automtictransaxle", Automotive Technical Society, (May 1995).

Primary Examiner—Rodney H. Bonck
Assistant Examiner—Ankur Parekn
Attorney, Agent, or Firm—Foley & Lardner

[57] ABSTRACT

A hydraulic engagement apparatus for automatic transmissions includes a high clutch and a reverse clutch disposed adjacent to each other so as not to axially overlap with each other, each clutch including drive plates engaged with an inner surface of a clutch drum. When engaged, the high clutch and the reverse clutch serve to transmit rotation of an input shaft to a high-clutch hub and a reverse-clutch hub, respectively. A high-clutch piston and a reverse-clutch piston are arranged to axially spaced relative to each other, and to be movable with respect to the drive plates of the high clutch and the reverse clutch.

11 Claims, 3 Drawing Sheets

|  | REV/C | HIGH/C | 2-4/B | LOW/C | L&R/B | LOW O.W.C |
|---|---|---|---|---|---|---|
| 1st |  |  |  | ○ | ◌ | ◍ |
| 2nd |  |  | ○ | ○ |  |  |
| 3rd |  | ○ |  | ○ |  |  |
| 4th |  | ○ | ○ |  |  |  |
| Rev | ○ |  |  |  | ○ |  |

HYDRAULIC ENGAGEMENT APPARATUS FOR AUTOMATIC TRANSMISSIONS

BACKGROUND OF THE INVENTION

The present invention relates to a hydraulic engagement apparatus for automatic transmissions.

The hydraulic engagement apparatus arranged in a power transmission serves as a shift element put in engagement or disengagement hydraulically. Conventionally, the hydraulic engagement apparatus comprises a reverse clutch for reverse run interposed between a reverse-clutch drum and a reverse-clutch hub and is put in engagement through a reverse-clutch piston, and a high clutch for overdrive interposed between a high-clutch drum and a high-clutch hub and is put in engagement through a high-clutch piston.

The reverse-clutch hub is fixed to the high-clutch drum, which is directly connected to an input shaft, and the reverse-clutch drum is connected to a sun gear of a front planetary gear, and the high-clutch hub is connected to a pinion carrier of the front planetary gear.

However, the known hydraulic engagement apparatus has the following problems:

1) Due to the structure with two clutch drums and two clutch hubs, the apparatus is large in size in the axial and radial directions, having a disadvantage in weight and space;
2) Due to no existence of a rotary member, which rotates in the same way as the input shaft at the outer side of the apparatus, it is difficult to arrange a turbine sensor for measuring the turbine revolution available to shift control; and
3) When racing the engine at N range with the high clutch seizing, the sun-gear connected members such as reverse-clutch drum and reverse-clutch piston are over-rotated, increasing possible burst of the reverse-clutch drum. That is, with the high clutch seizing, rotation of the input shaft is transmitted to the high-clutch hub through the high clutch, rotating the pinion carrier of the front planetary gear. This produces rotation of the sun gear with the input shaft rotating at increased speed, over-rotating the reverse-clutch drum, etc. connected to the sun gear.

The solution of the above problems is proposed, for example, in the document entitled "Advanced Shift Control Technology on Newly-developed Automatictransaxle" published in May, 1995 by the Automotive Technical Society. Specifically, the reverse-clutch piston with piston stopper is arranged to the reverse-clutch drum on the inner-diameter side thereof so as not to rotate relative to the reverse-clutch drum. The reverse-clutch piston also serves as a high-clutch drum.

The high clutch has an input side directly connected to the input shaft through the reverse-clutch piston and the reverse-clutch drum, and an output side connected to the pinion carrier of the front planetary gear through the high-clutch hub. The reverse clutch has an output side connected to the sun gear of the front planetary gear through the reverse-clutch hub.

With this apparatus, the two pistons are axially placed on each other, obtaining reduced axial dimension of the apparatus. Further, the reverse-clutch drum, which rotates in the same way as the input shaft, is disposed at the outer side of the apparatus, enabling easy arrangement of the turbine sensor. Furthermore, only the reverse-clutch hub serves as a sun-gear connected member, so that, even when racing the engine at N range with the high clutch seizing, burst of the reverse-clutch drum can be avoided.

However, the above proposition also has the following problems:

1) Since the reverse-clutch piston also serves as a high-clutch drum, the radial dimension of the apparatus is restricted to decrease the radial dimension of plates of the high clutch, lowering the clutch capacity, i.e., heat and torque capacities of the high clutch;
2) Due to heavy weight of a member disposed inside the reverse-clutch drum, distortion of the drum is easy to occur by a centrifugal force with rotation thereof. Specifically, since, with the reverse clutch engaged, the reverse-clutch piston transmits power to the reverse-clutch drum through the piston stopper, the conventional aluminum-alloy piston is deficient in strength, requiring a material change to iron, resulting in increased weight; and
3) Two splines are needed in inner surfaces of the reverse-clutch drum and the reverse-clutch piston, resulting in increased manufacturing cost.

It is, therefore, an object of the present invention to provide a hydraulic engagement apparatus for automatic transmissions that can secure required clutch capacity with no distortion of the reverse-clutch drum, nor increase in manufacturing cost and weight.

SUMMARY OF THE INVENTION

According to one aspect of the present invention, there is provided an apparatus for an automatic transmission with an input shaft, comprising:

a clutch drum directly connected to the input shaft;

first and second clutch hubs arranged in said clutch drum, said first and second clutch hubs being separate members, respectively;

first and second clutches, each including plates engaged with an inner surface of said clutch drum, said first and second clutches transmitting, when engaged, rotation of the input shaft to said first and second clutch hubs, respectively, said first and second clutches being disposed adjacent to each other so as not to axially overlap with each other; and first and second pistons arranged in said clutch drum, said first and second pistons being axially placed on each other, said first and second pistons being movable with respect to said plates of said first and second clutches.

Another aspect of the present invention lies in providing, in an automatic transmission:

an input shaft;

a clutch drum directly connected to said input shaft;

first and second clutch hubs arranged in said clutch drum, said first and second clutch hubs being separate members, respectively;

first and second clutches, each including plates engaged with an inner surface of said clutch drum, said first and second clutches transmitting, when engaged, rotation of said input shaft to said first and second clutch hubs, respectively, said first and second clutches being disposed adjacent to each other so as not to axially overlap with each other; and first and second pistons arranged in said clutch drum, said first and second pistons being axially spaced relative to each other, said first and second pistons being movable with respect to said plates of said first and second clutches.

DETAILED DESCRIPTION OF THE INVENTION

Figure 1:
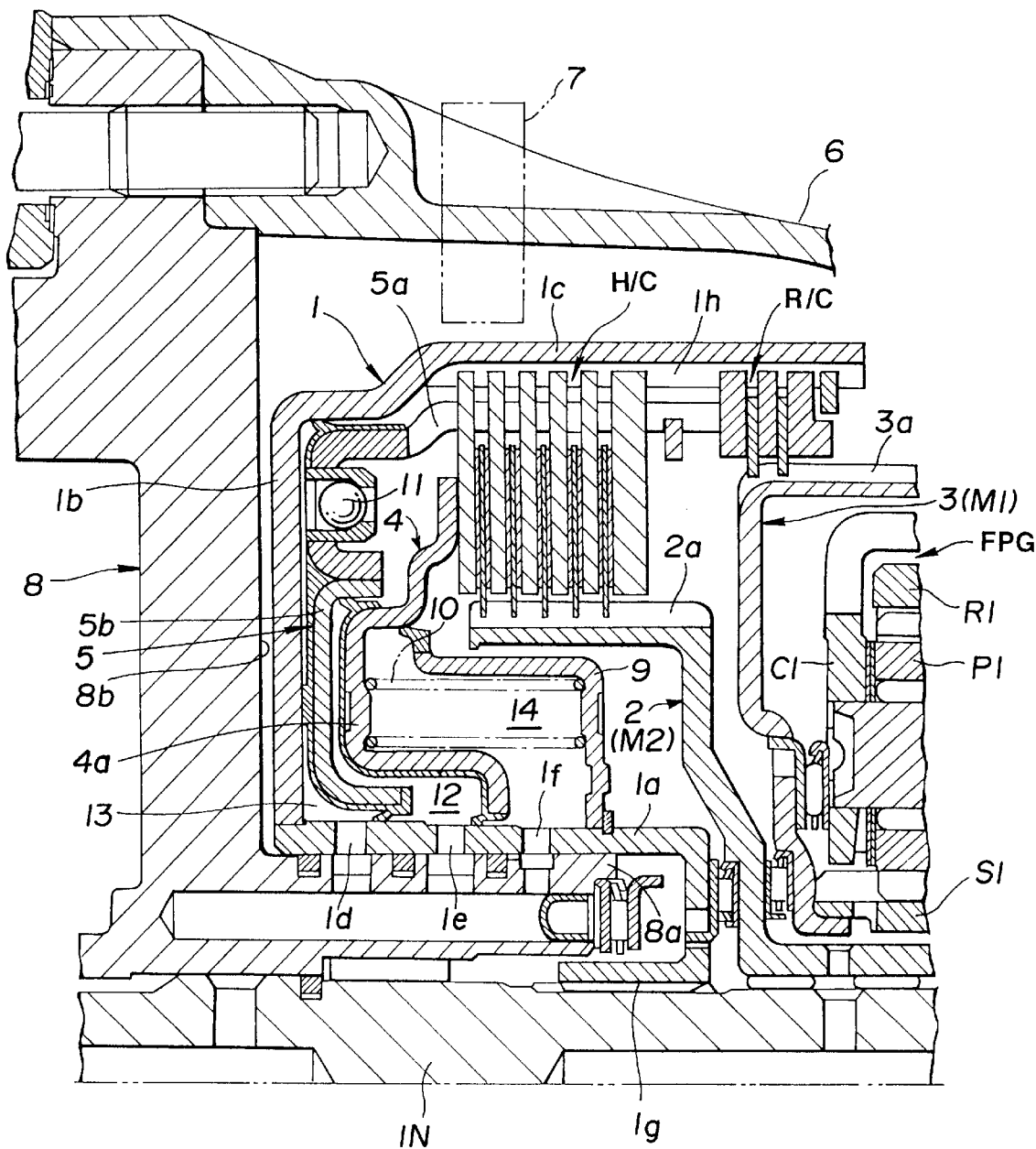
FIG. 1 is a sectional view showing an embodiment of a hydraulic engagement apparatus for automatic transmissions according to the present invention.

Referring to the drawings, a description will be made with regard to preferred embodiments of a hydraulic engagement apparatus for automatic transmissions according to the present invention.

Figures 2, 3:
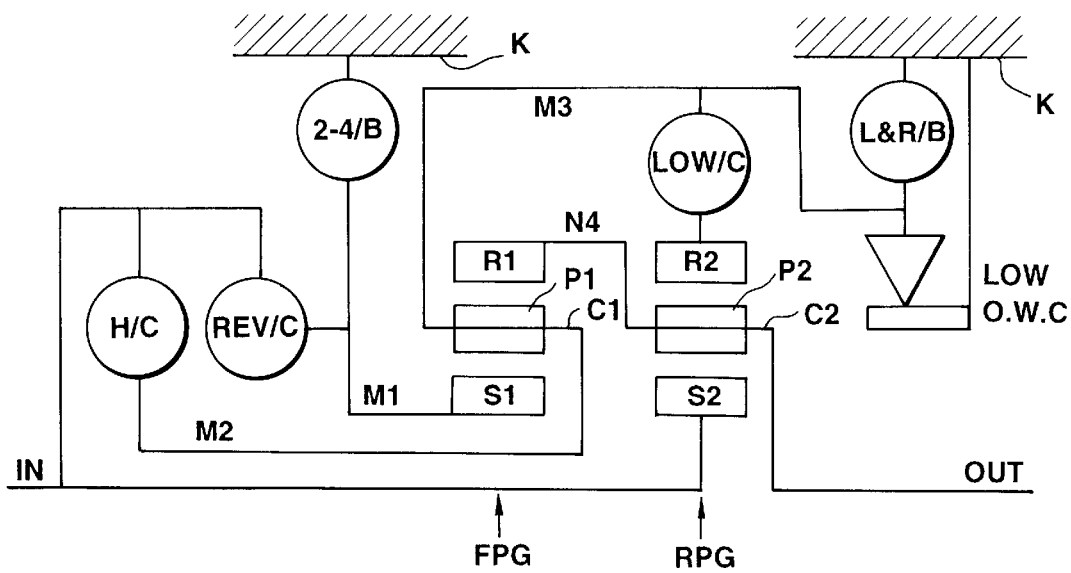
FIG. 2 is a block diagram showing a power transmission to which the hydraulic engagement apparatus is applied.
FIG. 3 is a table showing an operating logic of engagement elements of the automatic transmissions in each gear positions.

Referring first to FIG. 2, a power transmission to which an embodiment of a hydraulic engagement apparatus is applied comprises an input shaft IN, an output shaft OUT, a front planetary gear FPG, and a rear planetary gear RPG. The front planetary gear FPG comprises a first sun gear S1, a first ring gear R1, a first pinion P1, and a first pinion carrier C1. The rear planetary gear RPG comprises a second sun gear S2, a second ring gear R2, a second pinion P2, and a second pinion carrier C2.

In order to obtain four forward speeds and one reverse speed by using the above gear train, the power transmission further comprises as engagement elements a reverse clutch REV/C (refer hereafter to as R/C), a high clutch HIGH/C (refer hereafter to as H/C), a 2-4 brake 2-4/B, a low clutch LOW/C (refer hereafter to as L/C), a low and reverse brake L & R/B, and a low one-way clutch LOW O.W.C.

The first sun gear S1 is connected to the input shaft IN through a first rotation member M1 and the reverse clutch R/C, and also to a casing K through the first rotation member M1 and the 2-4 brake 2-4/B.

The first carrier C1 is connected to the input shaft IN through a second rotation member M2 and the high clutch H/C, and also to the casing K through a third rotation member M3 and the low and reverse brake L & R/B. Moreover, the first carrier C1 is connected to the second ring gear R2 through the third rotation member M3 and the low clutch L/C.

The low one-way clutch LOW O.W.C is disposed parallel to the low and reverse brake L & R/B.

The first ring gear R1 is directly connected, through a fourth rotation member M4, to the second pinion carrier C2 to which the output shaft OUT is directly connected.

The second sun gear S2 is directly connected to the input shaft IN.

Referring to FIG. 1, H/C designates the high clutch or first clutch, R/C designates the reverse clutch or second clutch, IN designates, input shaft, 1 designates, a clutch drum, 2 designates, a high-clutch hub or first-clutch hub or second rotation member M2, 3 designates, a reverse-clutch hub or second-clutch hub or first rotation member M1, 4 designates, a high-clutch piston or first piston, 5 designates, a reverse-clutch piston or second piston, FPG designates front planetary gear, S1 designates the first sun gear, R1 designates the first ring gear, P1 designates first pinion, C1 designates first pinion carrier, 6 designates a transmission casing, 7 designates a turbine sensor, and 8 designates an oil-pump casing.

The high clutch H/C and the reverse clutch R/C are disposed adjacent to each other so as not to axially overlap with each other. When engaged, the clutches H/C, R/C serve to transmit rotation of the input shaft IN to the two different clutch hubs, i.e., the high-clutch hub 2 and the reverse-clutch hub 3 through the clutch drum 1.

The high clutch H/C and the reverse clutch R/C comprise drive plates spline-engaged with the clutch drum 1, and driven plates spline-engaged with the clutch hub 2, 3, respectively.

The clutch drum 1 includes an inner periphery 1a, a bottom 1b, and an outer periphery 1c to form an inverted C-shaped space. Arranged on the bottom or closed side of the clutch drum 1 is the high clutch H/C, and arranged on the open side thereof is the reverse clutch R/C.

The inner periphery 1a of the clutch drum 1 is rotatably supported to a drum support portion 8a of the oil-pump casing 8, and is formed with a reverse-clutch pressure port 1d, a high-clutch pressure port 1e, and a working-fluid port 1f. An extension of the inner periphery 1a is formed at an end thereof and includes a spline 1g engaged with the input shaft IN.

The bottom 1b of the clutch drum 1 is disposed close to an inner wall 8b of the oil-pump casing 8.

The outer periphery 1c of the clutch drum 1 includes a spline 1h formed in the same shape in its entirety for carrying out engagement of the drive plates of the high clutch H/C and the reverse clutch R/C disposed adjacent to each other so as not to axially overlap with each other.

The high clutch hub 2 has one end formed with a spline 2a for carrying out engagement of the driven plates of the high clutch H/C, and another end formed with a spline, not shown, for carrying out engagement with the first pinion carrier C1 of the front planetary gear FPG.

The reverse-clutch hub 3 has one end formed with a spline 3a for carrying out engagement of the driven plates of the reverse clutch R/C, and another end to which the first sun gear S1 of the front planetary gear FPG is fixed.

The high-clutch piston 4 and the reverse-clutch piston 5 are disposed on the inner periphery 1a of the clutch drum 1 to axially be placed on each other.

The high-clutch piston 4 includes a clutch pressing portion having a smaller diameter than that of the reverse-clutch piston 5, and a cancel piston 9 for producing a counter pressure in the direction opposite to the plate pressing direction of the high clutch H/C. A return spring 10 is interposed between the cancel piston 9 and the high-clutch piston 4. The reverse-clutch piston 5 includes a plate through portion 5a arranged through the drive plates of the high clutch H/C, and a drift-on ball 11 arranged at the upper portion thereof.

The high-clutch piston 4 and the reverse-clutch piston 5 include a press-formed piston with baking rubber.

Next, the operation of the embodiment will be described.

Referring first to FIG. 3, the shift operation in each gear position will be described.

The first speed is obtained by hydraulic engagement of the low clutch L/C, and hydraulic engagement of the low and reverse brake L & R/B (upon engine-brake range selected) or mechanical engagement of the low one-way clutch LOW O.W.C (upon acceleration). That is, input to the second sun gear S2, the second ring gear R2 fixed, and output from the second pinion carrier C2.

The second speed is obtained by hydraulic engagement of the low clutch L/C and the 2-4 brake 2-4/B. That is, input to the second sun gear S2, the first sun gear S1 fixed, and the output from the second pinion carrier C2.

The third speed is obtained by hydraulic engagement of the high clutch H/C and the low clutch L/C. That is, simultaneous input to the second ring gear R2 and the second sun gear S2, and output from the second pinion carrier C2 (speed ratio=1). Upon upshift from the second speed to the third speed, the high clutch H/C, which has been disengaged, is put in engagement hydraulically, which is carried out by supplying pressure oil from the high-clutch pressure port 1e to a high-clutch piston chamber 12 so that the high-clutch piston 4 makes a stroke rightward as viewed in FIG. 1 against a biasing force of the return spring 10.

The fourth speed or overdrive speed is obtained by hydraulic engagement of the high clutch H/C and the 2-4 brake 2-4/B. That is, input to the first pinion carrier C1 and the second sun gear S2, the first sun gear S1 fixed, and output from the second pinion carrier C2.

The reverse speed is obtained by hydraulic engagement of the reverse clutch R/C and the low and reverse brake L & R/B. That is, input to the first and second sun gears S1, S2, the first pinion carrier C1 fixed, and output from the second pinion carrier C2. When selecting the reverse speed, the reverse clutch R/C which has been disengaged is put in engagement hydraulically, which is carried out by supplying pressure oil from the reverse-clutch pressure port 1d to a reverse-clutch piston chamber 13 so that the reverse piston 5 makes a stroke rightward as viewed in FIG. 1.

According to the embodiment, the high-clutch piston 4 and the reverse-clutch piston 5 are disposed on the inner periphery 1a of the clutch drum 1 and axially spaced relative to each other, obtaining reduced axial dimension as compared with arrangement of the two pistons 4, 5 axially separated. Moreover, the clutch drum 1 disposed outside for defining the outer diameter of the apparatus is a single member having an inner surface with which both the drive plates of the high clutch H/C and those of the reverse clutch R/C are spline-engaged, having reduced radial dimension as compared with arrangement of the two clutch drums radially overlapped. Thus, the apparatus is decreased in both axial and radial dimensions, having increased degree of freedom of layout, contributing to a reduction in size of the power transmission.

According to the embodiment, since the clutch drum 1 disposed outside is a member directly connected to the input shaft IN, and thus rotates in the same way as the input shaft IN, information on the turbine revolution can easily be obtained, when required as input information of shift control, e.g., by arranging to the transmission casing 6 the turbine sensor 7 with a sensor portion directed to the clutch drum 1 as shown in FIG. 1.

When racing the engine at N range with the high clutch H/C seizing, rotation of the input shaft IN is transmitted to the first pinion carrier C1 through the high-clutch hub 2 of the high clutch H/C, resulting in possible over-rotation of the first sun gear S1 and the members connected thereto. However, according to the embodiment, since the two clutches H/C, R/C have the common input side due to the single clutch drum 1, and the separate output side due to the respective clutch hub 2, 3, the first-sun-gear connected members that can over-rotate with the first sun gear S1 over-rotating are only the driven plates of the reverse-clutch hub 3 and the reverse clutch R/C. Thus, even with the high clutch H/C seizing, burst of the clutch drum 1 is avoided.

According to the embodiment, since the clutch drum 1 is a single member having an inner surface with which both the drive plates of the high clutch H/C and those of the reverse clutch R/C are spline-engaged, the outer diameter of the clutches H/C, R/C, which diameter is defined by the inner diameter of the single clutch drum 1 only, has a larger value securing particularly, required heat and torque capacities of the high clutch H/C.

The splines should be machined with high accuracy for ensuring smooth engagement and disengagement of the clutch, resulting in increased manufacturing cost. However, according to the embodiment, the inner surface of the clutch drum 1 is formed with the spline 1h formed in the same shape in its entirety for carrying out engagement of the drive plates of the high clutch H/C and the reverse clutch R/C, having reduced number of machining processes of the spline as compared with forming of the two splines for the two clutches H/C, R/C, resulting in reduced manufacturing cost.

According to the embodiment, the high-clutch piston 4 is a piston provided with the cancel piston 9 for producing a counter pressure in the direction opposite to the plate pressing direction of the high clutch H/C. Thus, upon 3-2 downshift where the high clutch H/C is put in disengagement, a centrifugal hydraulic pressure (due to working fluid within the high-clutch piston chamber 12) operating on the high-clutch piston 4 in the plate pressing direction of the high clutch H/C and that one (due to working fluid within the cancel piston chamber 14) operating thereon in the direction opposite thereto cancel out each other, producing no engagement of the high-clutch piston 4 by a centrifugal hydraulic pressure or engagement pressure produced in the high-clutch piston chamber 12, thus preventing dragging of the high clutch H/C upon disengagement thereof.

According to the embodiment, the reverse-clutch piston 5 is a press-formed piston arranged through the drive plates of the high clutch H/C, having lighter weight than that of a cast piston. Due to reduced weight of the reverse-clutch piston 5 disposed inside the clutch drum 1, an outward force from inside the clutch drum 1 due to a centrifugal force is smaller when rotation of the input shaft IN is higher, resulting in restrained distortion of the clutch drum 1. This is favorable to arrangement of the turbine sensor 7 on the outer periphery of the clutch drum 1 since a clearance between the sensor portion of the turbine sensor 7 and the clutch drum 1 can be reduced, obtaining improved rotation detection accuracy.

Next, the effect of the embodiment will be described.

Since the high clutch H/C and the reverse clutch R/C constituting a double-row clutch are disposed adjacent to each other so as not to axially overlap with each other, and the clutch drum 1 is a single member having an inner surface with which the drive plates of the two clutches H/C, R/C are spline-engaged, and two different clutch hubs, i.e., the high-clutch hub 2 and the reverse-clutch hub 3, are arranged, the apparatus can be obtained with reduced axial and radial dimensions, easy arrangement of the turbine sensor 7, no burst of the clutch drum 1 with the high clutch H/C seizing, and secured required clutch capacity.

Further, since the inner surface of the clutch drum 1 is formed with the spline 1h formed in the same shape in its entirety for carrying out engagement of the drive plates of the high clutch H/C and the reverse clutch R/C, the apparatus can be obtained with a reduction in manufacturing processes of the spline, and thus in manufacturing cost.

Furthermore, the high clutch H/C is arranged on the bottom or closed side of the clutch drum 1, whereas the reverse clutch R/C is arranged on the open side thereof. The high-clutch piston 4 includes a clutch pressing portion 4a having a smaller diameter than that of the reverse-clutch piston pressing portions 5b, and a cancel piston 9 for producing a counter pressure in the direction opposite to the plate pressing direction of the high clutch H/C, whereas the reverse-clutch piston 5 includes a press-formed piston arranged through the drive plates of the high clutch H/C.

Thus, the apparatus can be obtained with dragging of the high clutch H/C prevented upon disengagement thereof due to a centrifugal hydraulic pressure, and distortion of the clutch drum 1 restrained.

Figure 4:
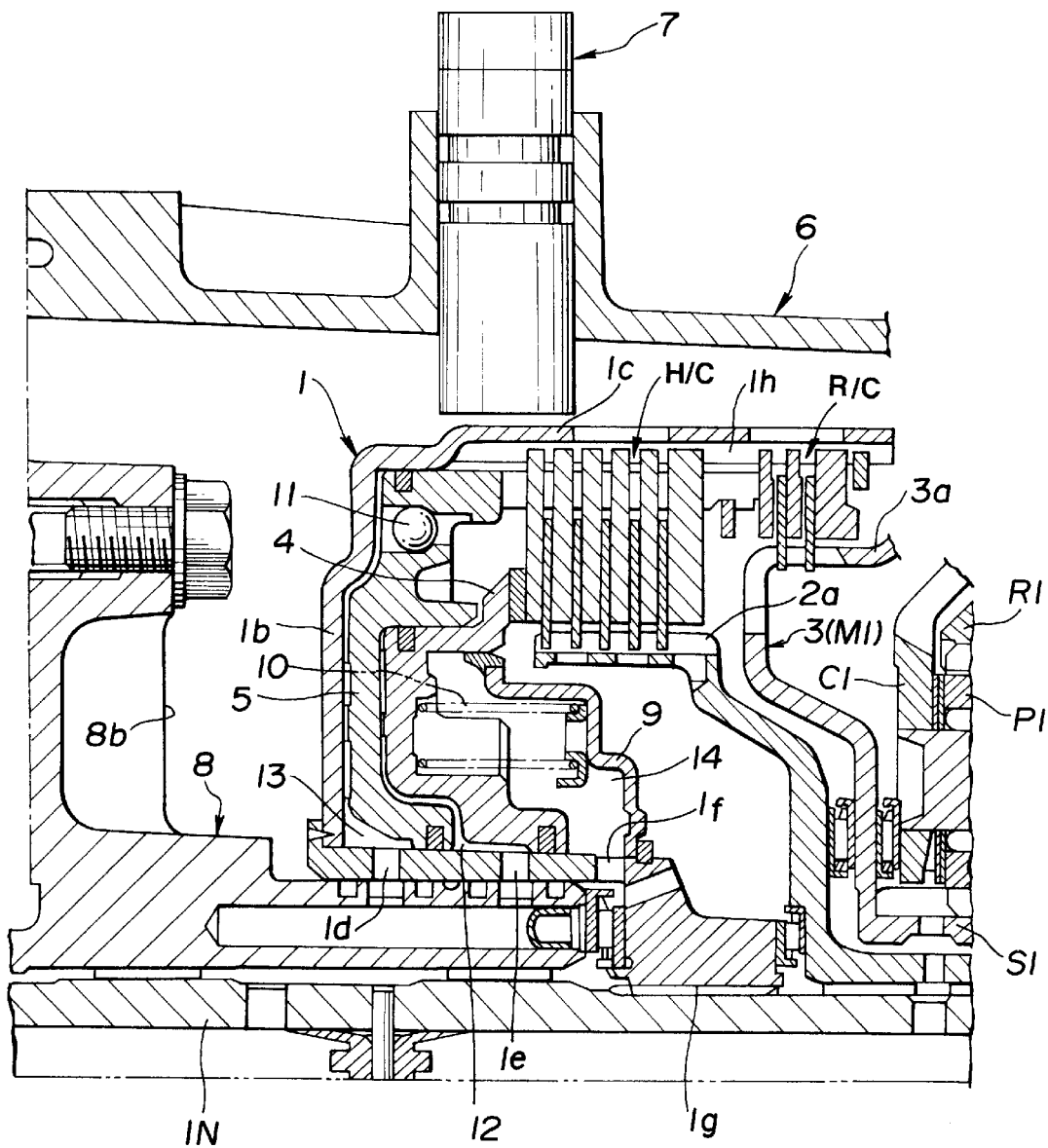
FIG. 4 is a view similar to FIG. 1, showing another embodiment of the present invention.

In the embodiment, the high-clutch piston 4 and the reverse-clutch piston 5 include a press-formed piston as shown in FIG. 1. Alternatively, referring to FIG. 4, both of the pistons H/C, R/C may include a cast piston, or one thereof may include a cast piston.

Further, in the embodiment, the first clutch corresponds to a high clutch, and the second clutch corresponds to a low clutch. Alternatively, the present invention is applicable to the other hydraulic clutches such as a multiplate clutch.

Furthermore, in the embodiment, the high-clutch piston includes a cancel piston, alternatively, it may be constructed with no cancel piston.

What is claimed is:

1. An engagement apparatus for an automatic transmission having an input shaft, comprising:
    a clutch drum adapted to be directly connected to the input shaft;
    first and second discrete clutch hubs arranged in said clutch drum;
    first and second clutches, each including plates engaged with an inner surface of said clutch drum, said first and second clutches, when engaged, being adapted to transmit rotation of the input shaft to the respective first or second clutch hub, said first and second clutches being disposed adjacent to each other so as not to axially overlap with each other; and
    first and second pistons arranged in said clutch drum, said first and second pistons being axially spaced relative to each other, said first and second pistons being movable with respect to said plates of said first and second clutches,
    wherein said inner surface of said clutch drum is formed with a spline engaged with said plates of said first and second clutches.

2. An apparatus as claimed in claim 1, wherein said first and second clutch hubs axially overlap with each other.

3. An apparatus as claimed in claim 1, wherein said clutch drum has a closed side and an open side, said first clutch being disposed on said closed side of said clutch drum and said second clutch being disposed on said open side thereof.

4. An apparatus as claimed in claim 3, wherein said first clutch is a high clutch for overdrive, and said second clutch is a reverse clutch for reverse run.

5. An apparatus as claimed in claim 1, wherein said spline has the same shape in its entirety.

6. An apparatus as claimed in claim 1, wherein said first piston includes a clutch pressing portion having a smaller diameter than that of said second piston.

7. An apparatus as claimed in claim 6, wherein said first piston includes a cancel piston for producing a counter pressure in a direction opposite to a plate pressing direction of said first clutch.

8. An apparatus as claimed in claim 1, wherein said second piston includes a portion arranged through said plates of said first clutch.

9. An apparatus as claimed in claim 1, wherein said first and second pistons are each press formed.

10. An apparatus as claimed in claim 9, wherein said first and second pistons are each cast formed.

11. An automatic transmission comprising:
    an input shaft;
    a clutch drum directly connected to said input shaft and having an inner surface formed with a spline;
    first and second discrete clutch hubs arranged in said clutch drum;
    first and second clutches, each including plates engaged with said spline, said first and second clutches each transmitting, when engaged, rotation of said input shaft to the respective first or second clutch hub, said first and second clutches being disposed adjacent to each other so as not to axially overlap with each other; and
    first and second pistons arranged in said clutch drum, said first and second pistons being axially spaced relative to each other, said first and second pistons being movable with respect to said plates of said first and second clutches.

* * * * *